(12) United States Patent
McManus

(10) Patent No.: US 9,890,762 B2
(45) Date of Patent: Feb. 13, 2018

(54) POSITIVE BOYANCY HYDRAULIC POWER SYSTEM AND METHOD

(71) Applicant: Gregory McManus, Napa, CA (US)

(72) Inventor: Gregory McManus, Napa, CA (US)

( * ) Notice: Subject to any disclaimer, the term of this patent is extended or adjusted under 35 U.S.C. 154(b) by 0 days.

(21) Appl. No.: 14/740,763

(22) Filed: Jun. 16, 2015

(65) Prior Publication Data

US 2015/0369206 A1    Dec. 24, 2015

Related U.S. Application Data

(60) Provisional application No. 62/015,707, filed on Jun. 23, 2014.

(51) Int. Cl.
| F03B 13/00 | (2006.01) |
| H02P 9/04 | (2006.01) |
| F03B 17/06 | (2006.01) |
| F04B 17/00 | (2006.01) |
| F04B 17/06 | (2006.01) |

(52) U.S. Cl.
CPC ............ *F03B 13/00* (2013.01); *F03B 17/061* (2013.01); *F04B 17/00* (2013.01); *F04B 17/06* (2013.01); *F05B 2240/917* (2013.01); *F05B 2260/406* (2013.01); *F05B 2270/18* (2013.01); *Y02E 10/28* (2013.01)

(58) Field of Classification Search
CPC ........ F03B 13/10; F03B 13/264; F03B 17/06; F03B 17/061
USPC .......................................... 290/54, 42, 43, 53
See application file for complete search history.

(56) References Cited

U.S. PATENT DOCUMENTS

| 2,501,696 | A | * | 3/1950 | Souczek | ............... | F03B 17/061 |
| | | | | | | 290/43 |
| 4,383,182 | A | * | 5/1983 | Bowley | ................ | F03B 13/183 |
| | | | | | | 290/43 |
| 6,091,161 | A | * | 7/2000 | Dehlsen | .................. | B63G 8/18 |
| | | | | | | 290/43 |
| 6,756,695 | B2 | * | 6/2004 | Hibbs | .................. | F03B 13/183 |
| | | | | | | 290/42 |
| 7,291,936 | B1 | * | 11/2007 | Robson | ................ | F03B 13/264 |
| | | | | | | 290/43 |
| 7,471,006 | B2 | * | 12/2008 | Janca | .................... | F03B 17/062 |
| | | | | | | 290/43 |

(Continued)

FOREIGN PATENT DOCUMENTS

| EP | 2216543 A1 * | 8/2010 | ............... B63J 3/02 |
| WO | WO 03056169 A1 * | 7/2003 | ............. F03B 13/10 |

OTHER PUBLICATIONS

Machine translation of WO 03/056169.*

*Primary Examiner* — Tulsidas C Patel
*Assistant Examiner* — Thomas Quigley
(74) *Attorney, Agent, or Firm* — Staniford Tomita LLP

(57) ABSTRACT

A hydraulic power system is used in a river, ocean or any other body of water having a current. The method is useful for generating useful electric power from flowing water. The flowing water rotates a turbine and a pump that provides hydraulic power to an electric generator for a clean, renewable energy source. The hydraulic power system tethered to the bottom of a body of water and a positive buoyancy mechanism can be integrated or tethered to the pump assembly. The positive buoyancy can support the pump assembly at a predetermined distance above the sea floor.

7 Claims, 14 Drawing Sheets

(56) References Cited

U.S. PATENT DOCUMENTS

| | | | | |
|---|---|---|---|---|
| 7,541,688 | B2* | 6/2009 | Mackie | F03B 13/26 |
| | | | | 290/54 |
| 7,682,126 | B2* | 3/2010 | Parker | F03B 17/061 |
| | | | | 415/3.1 |
| 8,219,257 | B2* | 7/2012 | Hunt | B63B 21/50 |
| | | | | 290/42 |
| 2007/0231072 | A1* | 10/2007 | Jennings | F03B 13/10 |
| | | | | 405/75 |
| 2009/0091135 | A1* | 4/2009 | Janca | F03B 13/10 |
| | | | | 290/54 |
| 2010/0276935 | A1* | 11/2010 | Dehlsen | F03B 13/00 |
| | | | | 290/54 |
| 2010/0327583 | A1* | 12/2010 | Hunt | B63B 21/50 |
| | | | | 290/43 |
| 2013/0106105 | A1* | 5/2013 | Dehlsen | F03B 17/061 |
| | | | | 290/43 |
| 2014/0083090 | A1* | 3/2014 | Larsson | F03B 13/185 |
| | | | | 60/398 |

* cited by examiner

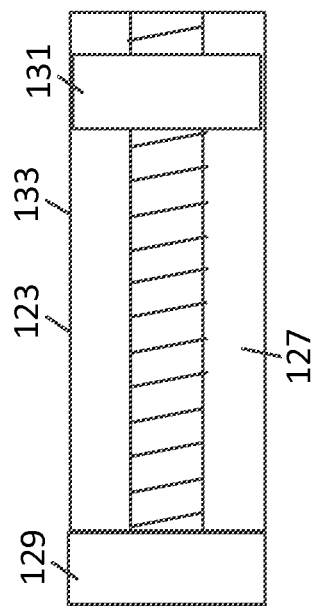
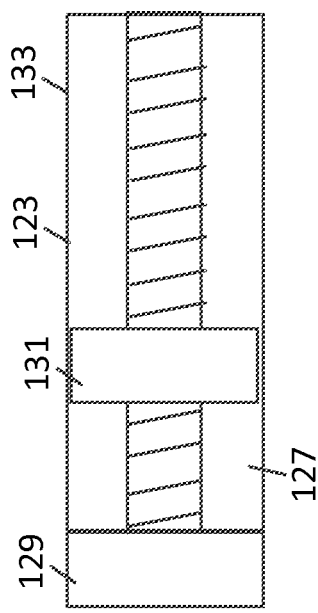
FIG. 2A
FIG. 2B

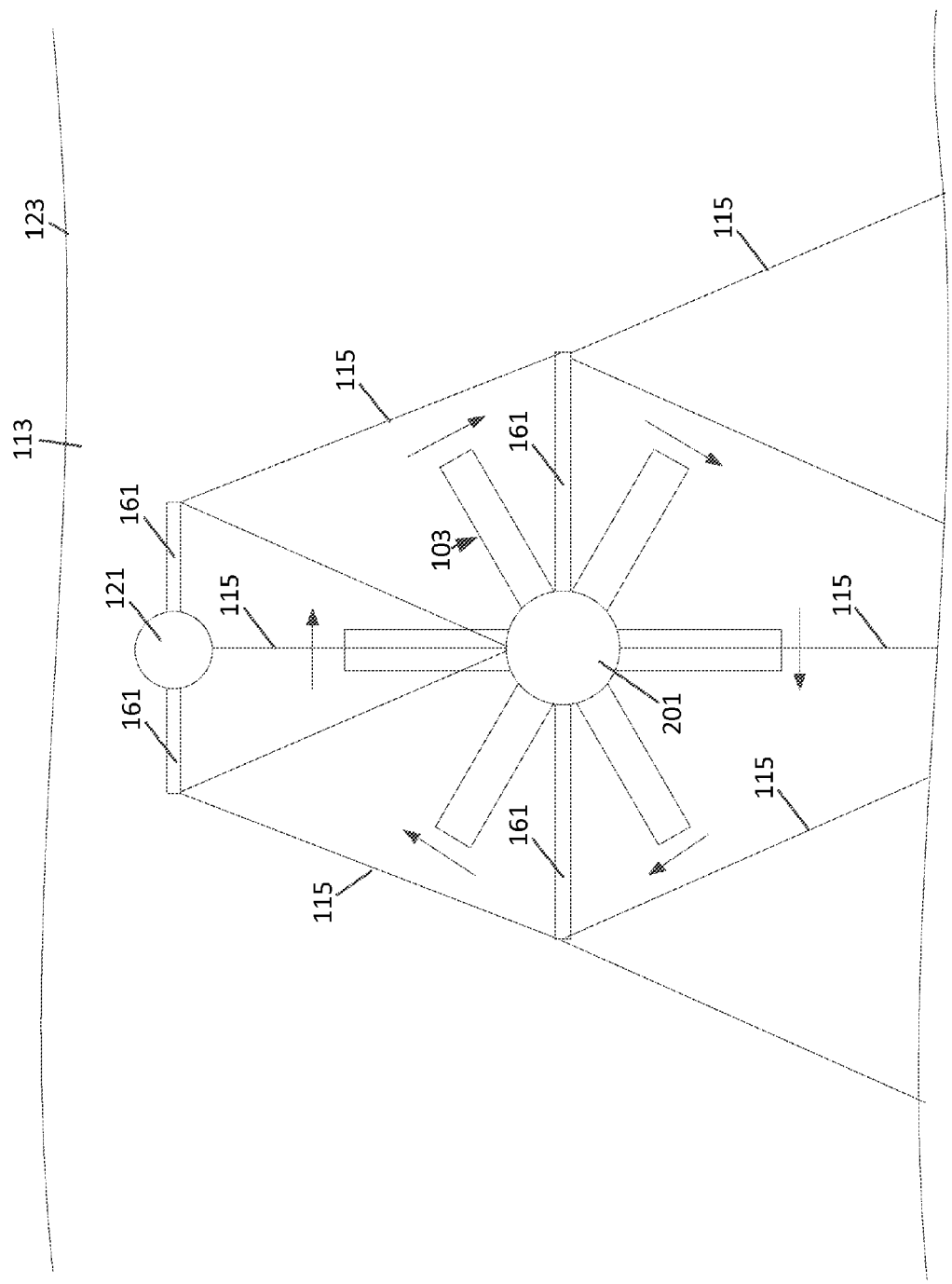

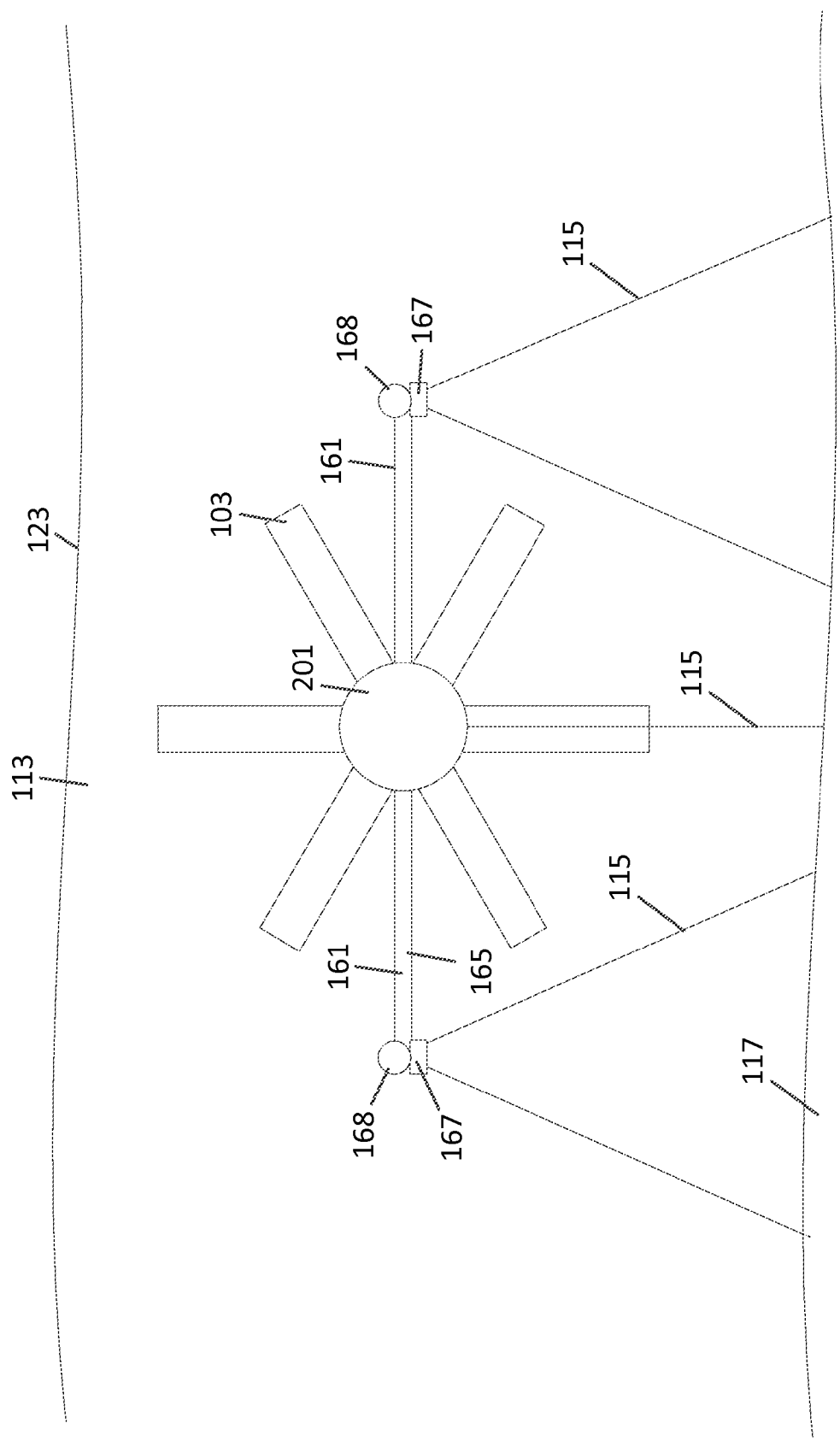

US 9,890,762 B2

POSITIVE BOYANCY HYDRAULIC POWER SYSTEM AND METHOD

CROSS REFERENCE TO RELATED APPLICATIONS

This application claims priority to U.S. Provisional Patent Application No. 62/015,707, "Positive Boyancy Hydraulic Power System And Method" filed Jun. 23, 2014 which is hereby incorporated by reference in its entirety.

BACKGROUND

Water has long been used as a source of energy. For over a century, water has been used to generate electricity as it flows from higher to lower elevation, rotating hydraulic turbines to create electricity. Current power, although not widely used, can also generate electricity by utilizing the same principle.

Transforming the energy in water into electricity is considered to be a clean, renewable source of energy, emitting no greenhouse gases when compared to fossil fuels. It has a low operating cost once installed and can be highly automated. An additional benefit is that the power is generally available on demand since the flow of water can be controlled.

Using hydro power also has disadvantages. Dams can block fish passage to spawning grounds or to the ocean, although many plants now have measures in place to help reduce this impact. The diversion of water can impact stream flow, or even cause a river channel to dry out, degrading both aquatic and streamside habitats. Hydroelectric plants can have an impact on water quality by lowering the amount of dissolved oxygen in the water. In the reservoir, sediments and nutrients can be trapped and the lack of water flow can create a situation for undesirable growth and the spread of algae and aquatic weeds.

While the use of water to produce electricity is an attractive alternative to fossil fuels, the technology must still overcome obstacles related to space requirements, building costs, environmental impacts, and the displacement of people. Further, possible locations for new hydropower projects are very limited. What is needed is a water powered system that can be used without the use of traditional means such as Hydroelectric plants.

SUMMARY OF THE INVENTION

In various embodiments, a hydraulic power system and method used in a fluid such as a river or any other body of water having a current. The system can include a hydraulic power system that is tethered to a floor at the bottom of the body of water. The inventive system can include a pump assembly that is coupled to a turbine that uses fluid movement to rotate the turbine and power the pump. A positive buoyancy structure can be tethered to the pump assembly that causes the pump assembly to be positioned above the floor at the bottom of the body of water. The positive buoyancy structure can potentially rise to the surface of the water but also maintain the pump assembly and turbine at a predetermined tethered distance below the surface of the water. The positive buoyancy structure can have a shape and pitch that uses the water velocity to generate lift and help to maintain the pump assembly above the water floor.

BRIEF DESCRIPTION OF THE DRAWINGS

FIGS. 2A and 2B illustrate a side view of an embodiment of a variable buoyancy mechanism;

FIGS. 8, 9 and 10 illustrate front views of pump assemblies with buoyancy structures;

FIGS. 15, 16 and 17 illustrate front views of the pump assemblies.

DETAILED DESCRIPTION

The present invention is directed towards a hydraulic power system and method used in a fluid such as a river or any other body of water having a current. In an embodiment the inventive system can include a hydraulic power system that is tethered to a floor at the bottom of the body of water. The inventive system includes a pump assembly that is coupled to a turbine that uses fluid movement to rotate the turbine and power the pump. A positive buoyancy structure can be tethered to the pump assembly that causes the pump assembly to be positioned above the floor at the bottom of the body of water. The positive buoyancy structure can potentially rise to the surface of the water but also maintain the pump assembly and turbine at a predetermined tethered distance below the surface of the water. In addition to the upward buoyancy force, the positive buoyancy structure can have a shape and pitch that uses the water velocity to generate lift and help to maintain the pump assembly above the water floor.

Figure 1:
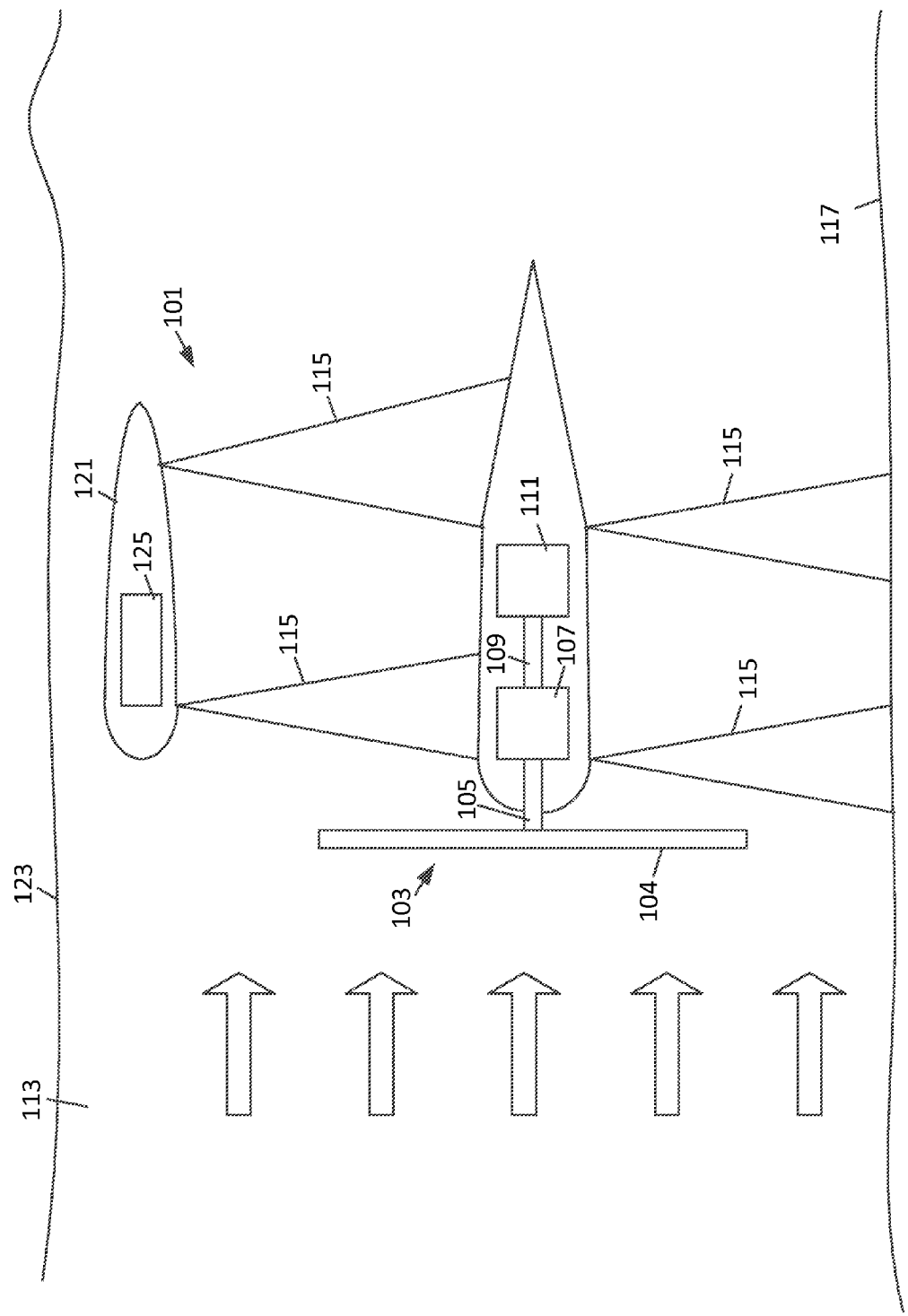
FIG. 1 illustrates a side view of an embodiment of the hydraulic power system.

With reference to FIG. 1, a hydraulic power system 100 is illustrated that includes a pump assembly 101 with a turbine 103 coupled to a front end of the pump assembly 101. The turbine 103 can have a plurality of blades 104 that rotate about a first shaft 105. The first shaft 105 is coupled to a gearing system 107 that can change the rotational velocity of a second shaft 109 mounted between the gearing system 107 and a pump 111. In the illustrated embodiment, the gearing system 107 may be placed between the turbine 103 and the pump 111. The turbine 103 can have a rotational velocity that is proportional to the velocity of the water 113 relative to the turbine 103. Thus, the rotational velocity of the turbine 103 and first shaft 105 can be variable. The turbine 103 can be coupled by the first shaft 105 to a gearing system 107 that can increase or decrease a rotational velocity of the second shaft 109 relative to the first shaft 105. The rotational energy from the turbine 103 can be transmitted through the first shaft 105, gearing system 107 and second shaft 109 to the pump 111.

The system can include a tether system with a plurality of high strength tether lines 115 coupling the pump assembly 101 to the floor 117 of the body of water 113. A buoyancy structure 121 can be coupled with tether lines 115 to the top of the pump assembly 101 and the buoyancy structure 121 can help to lift the pump assembly 101 above the floor 117 and prevent the turbine 103 from contacting the floor 117. The buoyancy structure 121 can also keep the pump assembly 101 below the surface 123 of the water 113 to prevent the top of the turbine 103 from coming out of the water 113. In an embodiment, the buoyancy structure 121 includes a variable buoyancy mechanism 125, which can alter the upward force applied to the pump assembly 101. In calm conditions with lower velocity water, less upward force can be required to keep the pump assembly 101 at the proper vertical position within the water 113. Thus, less buoyant forces from the buoyancy structure 121 are necessary. However, as the water 113 flow increases, the drag forces on the pump assembly 101 will also increase, which will pull the pump assembly 101 downstream. A greater buoyant force can be required to counteract the drag force and pull the pump assembly 101 back to the desired position. In an embodiment, the pump assembly 101 can have a positive buoyance and the buoyancy structure 121 can supplement these positive buoyant forces.

In order to minimize the drag forces on the pump assembly 101, the housing of the pump assembly 101 may be made to have a hydrodynamic shape with a rounded front end and a tapered back portion. By having a smooth hydrodynamic shape, the forces overcome the drag forces and raise the pump assembly 101 to the proper height within the water 113 can be minimized. Because the hydrodynamic drag does not provide any benefit to the inventive system, this drag should be minimized.

With reference to FIGS. 2A and 2B, in an embodiment, the variable buoyancy mechanism 125 can include a compressible volume 127 of gas with an actuator 129 to alter the gas volume 127. When the volume 127 is allowed to expand as shown in FIG. 2A, the buoyancy force will increase and when the volume 127 is compressed as shown in FIG. 2B, the buoyancy force will decrease. In an embodiment, the compressible volume 127 can be a gas cylinder with a piston 131 that is coupled to an actuator 129, which can be controlled to compress or decompress the gas volume 127 in the cylinder 133. The cylinder 133 and exposed side of the piston 131 may be exposed to the ambient water pressure so that when the cylinder 133 is deep in the water, the water pressure may tend to further compress the cylinder. Thus, the actuator may need to oppose the water pressure by expanding the cylinder volume 127. With reference to FIG. 1, by controlling the buoyancy, the buoyancy structure 121 can control the upward force and the vertical position of the pump assembly 101.

Figure 3:
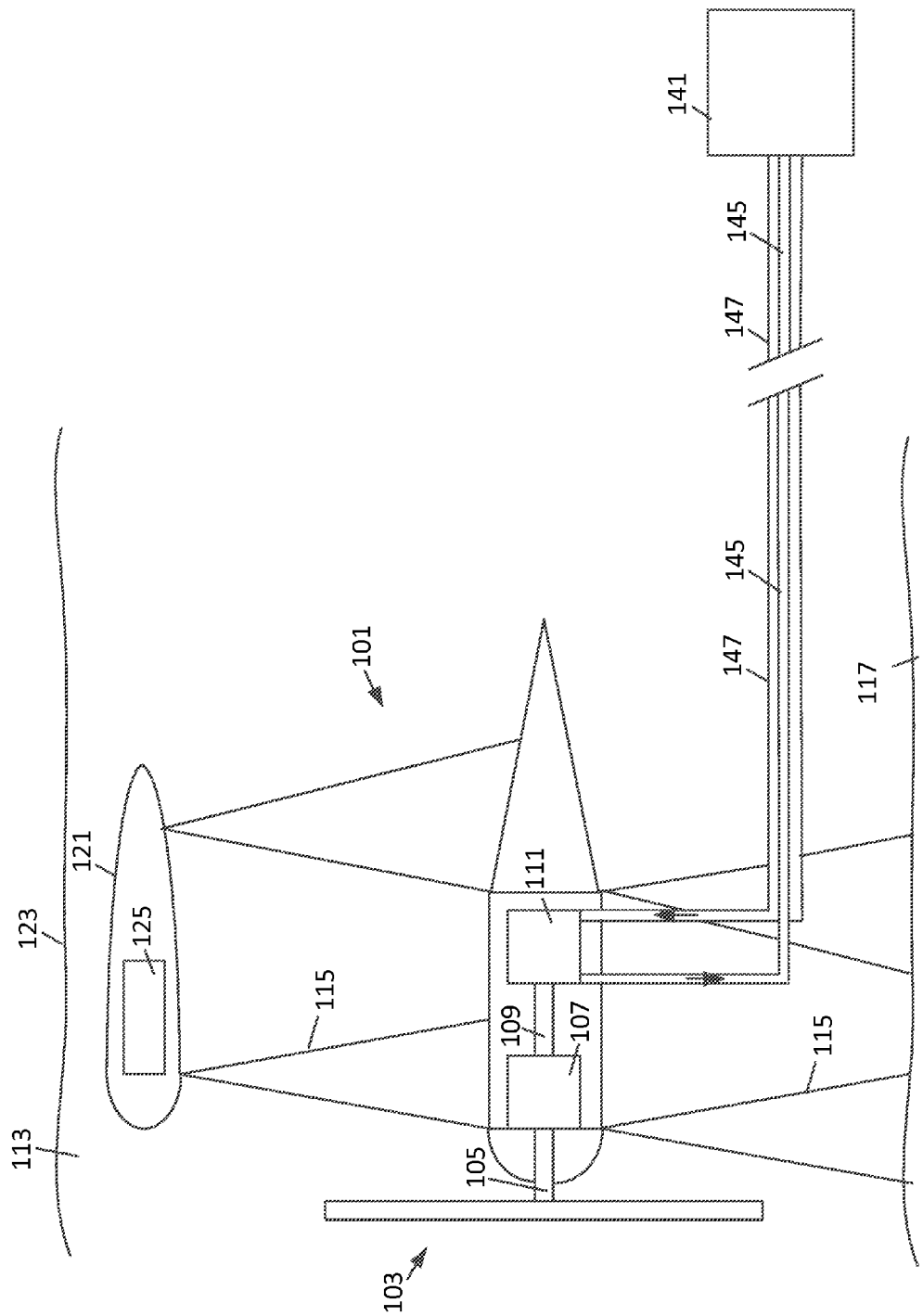
FIG. 3 illustrates a turbine pump system, piping and on a closed loop energy generation system.

With reference to FIG. 3, a more detailed illustration of the hydraulic power system 101 is shown. The pump 111 can circulate a fluid such as water through a piping system to an onshore power station 141. The pump 111 can be a closed loop system as shown where the liquid in the system circulates from the pump 111 through the piping system 143 to the power station 141 and then back through the piping system 143 to the pump 111. This closed loop system can be preferable because sediment and debris can be removed from the circulating fluid (such as water), which can damage the pump 111 and/or power station 141. In this illustration, the piping system 143 is a closed loop system with concentric outlet and return paths. The liquid can be pumped on shore to the power station 141 through the center pipe 145 and the liquid may return through the outer piping 147. Alternatively, the liquid can be pumped on shore to the power station 141 through the outer piping 147 and the inner pipe 145 can be the liquid return.

Figure 4:
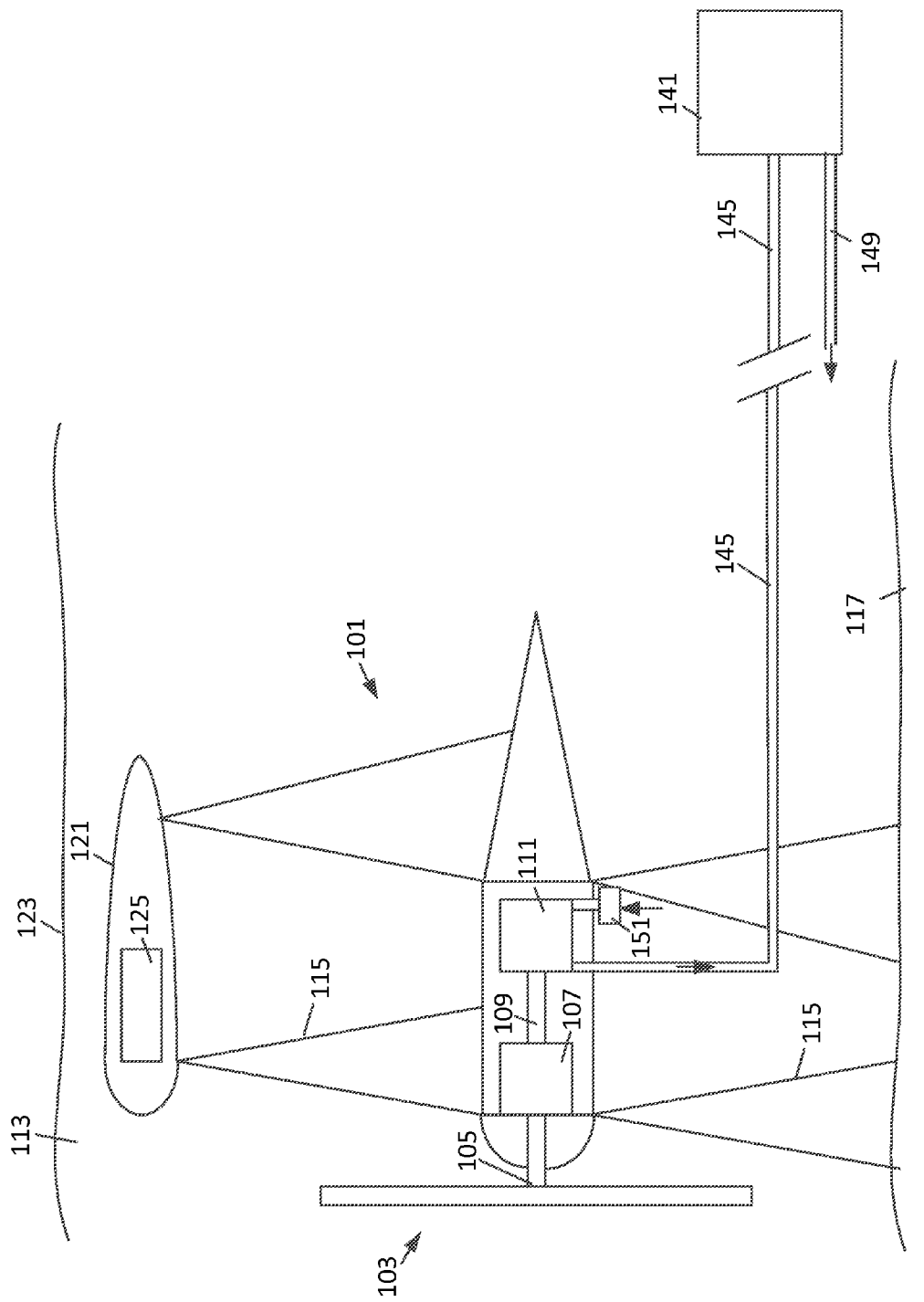
FIG. 4 illustrates a turbine pump system, piping and on an open loop energy generation system.

In an alternative embodiment with reference to FIG. 4, the system can be an open loop system where ambient water is pumped from the pump 111 through the piping system center pipe 145 to the onshore power station 141 and then released back to the body of water 113 through an outlet pipe 149. The open loop system can be more energy efficient because there is less friction and pressure losses due to the liquid flowing through the piping system center pipe 145. However, the water being pumped may need to be filtered through a filter 151 to prevent debris from entering the pump 111, which can add fluid flow friction and reduce the efficiency of the system. In other embodiments the pump 111 can be used to pressurize a compressible fluid that runs in an open loop as shown in FIG. 3 or closed loop as shown in FIG. 3 to an on shore power system 141.

In yet other embodiments, the pumps can be replaced by other energy producing devices such as electrical power generators 181, which can convert the rotational energy transmitted from the turbines 103 into electrical power. In this embodiment, the generator 181 can produce direct current or alternating electrical current that can be transmitted through electrical conductors 183 away from the generator assembly 191 to an on shore power station 185. In each of these alternative embodiments, the inventive system can utilize the positive buoyancy and or hydrodynamic lift of the wings to maintain the position of the generator assembly 191 and turbine 103 above the floor 117.

Figure 6:
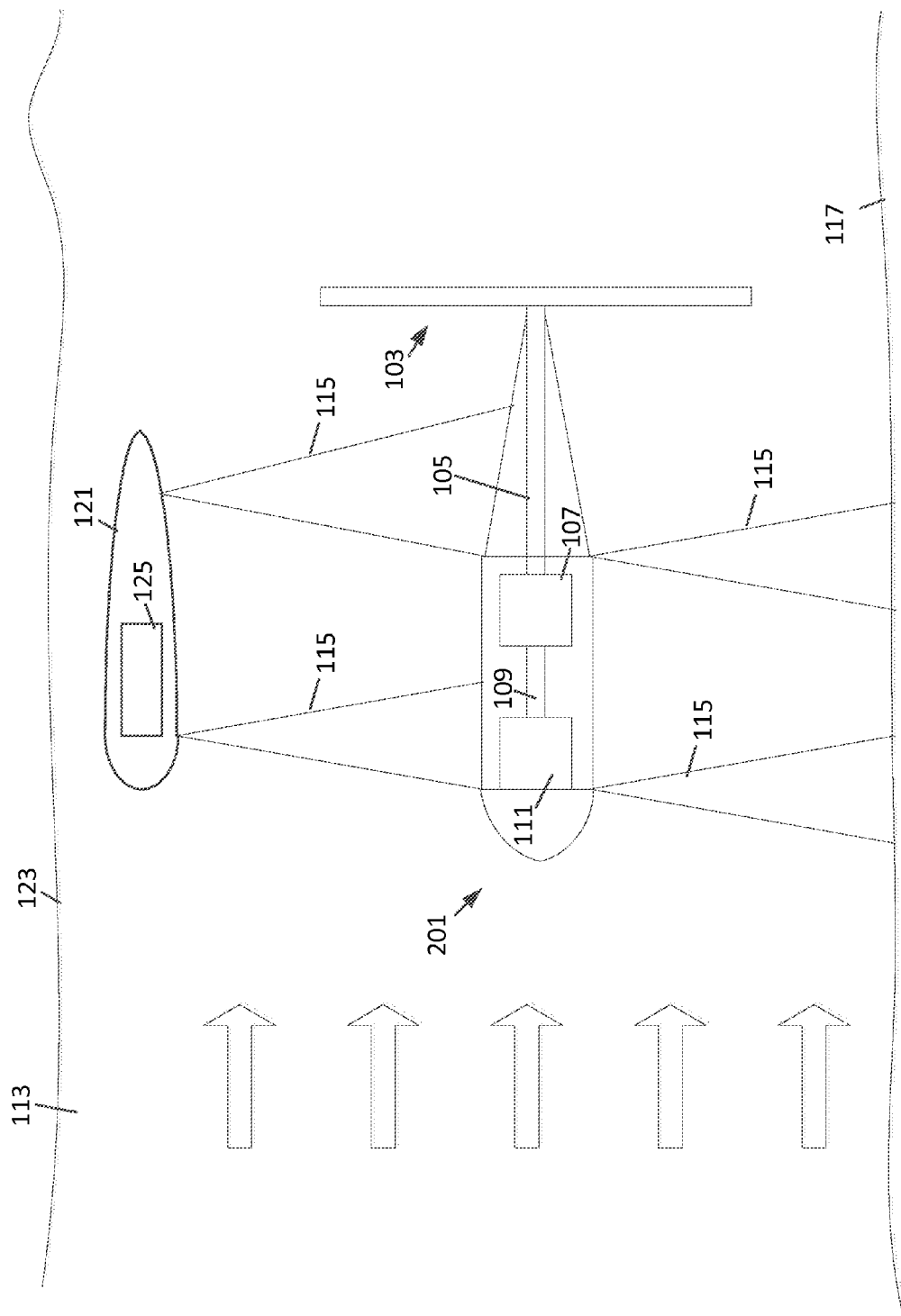
FIGS. 6 and 7 illustrate an embodiment of a pump assembly with the turbine on the back end of the pump assembly structure.

With reference to FIG. 6, another embodiment of the pump assembly 201 is illustrated with the turbine on the back end of the pump assembly 201 structure. This configuration can provide hydrodynamic stability to the system because the drag generated by the turbine 103 is now at the rear of the assembly where there is less tendency for the drag forces to push the pump assembly 201 out of alignment with the water flow. Another benefit is that as the drag forces push the pump assembly 201 down stream, the tethers 115 will lie at a more acute angle in relation to the water floor. However these angled tethers 115 will be less like likely to interfere with the turbine 103 rotation. In an embodiment, the pump assembly 201 can have a positive buoyance and the buoyancy structure 121 can supplement these positive buoyant forces.

Figure 7:
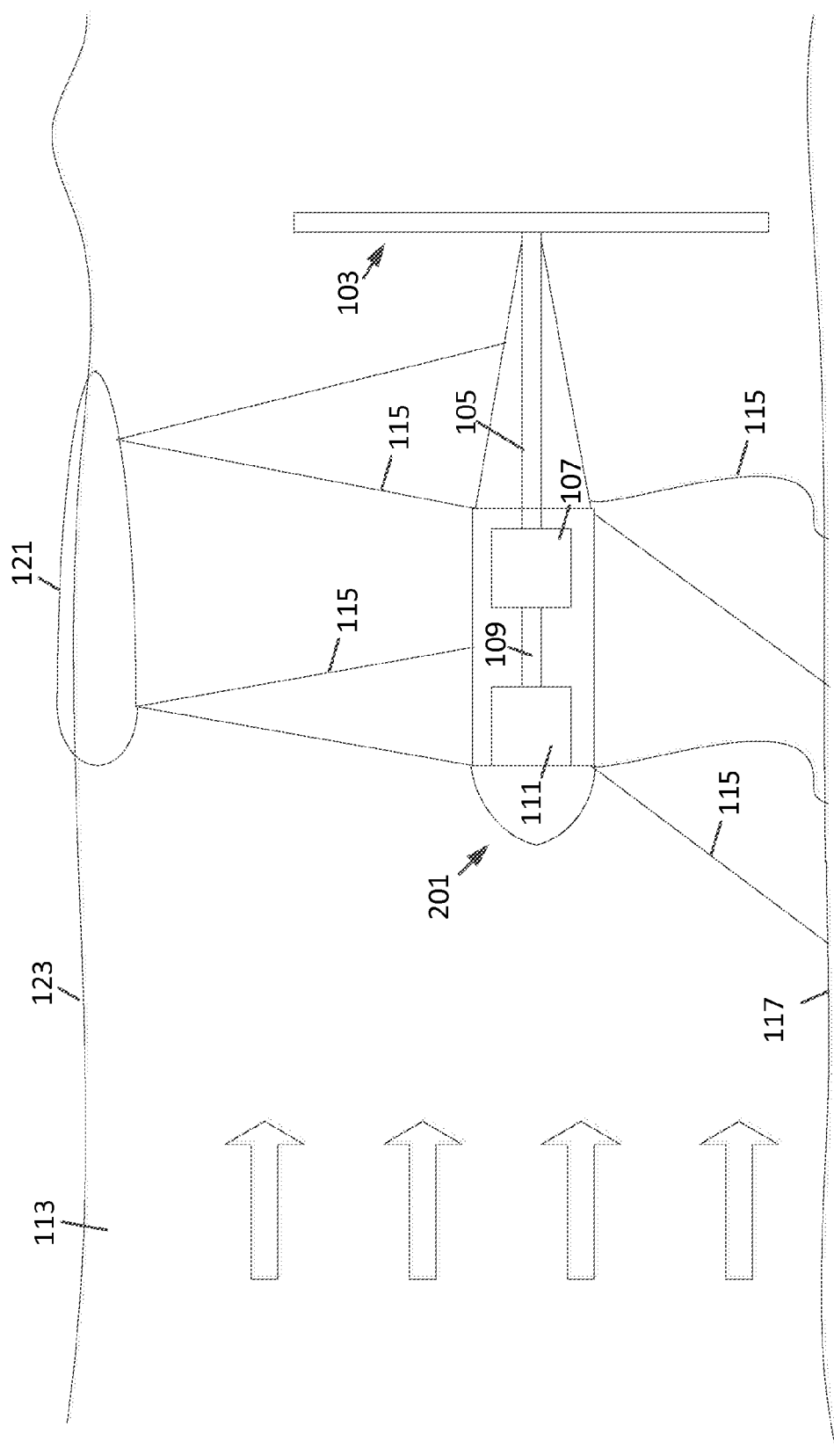

With reference to FIG. 7, if the water level 123 decreases in the body of water 113, the buoyancy structure 121 may float on the surface 123 of the water 113, which can result in the pump assembly 201 and turbine 103 being lowered close to the sea floor 117. When the water lever 123 rises, the pump assembly 201 will rise higher over the sea floor 117 until the tethers 115 are all tights. However, the turbine 103 will not rise above the water 113 surface level 123.

Figure 5:
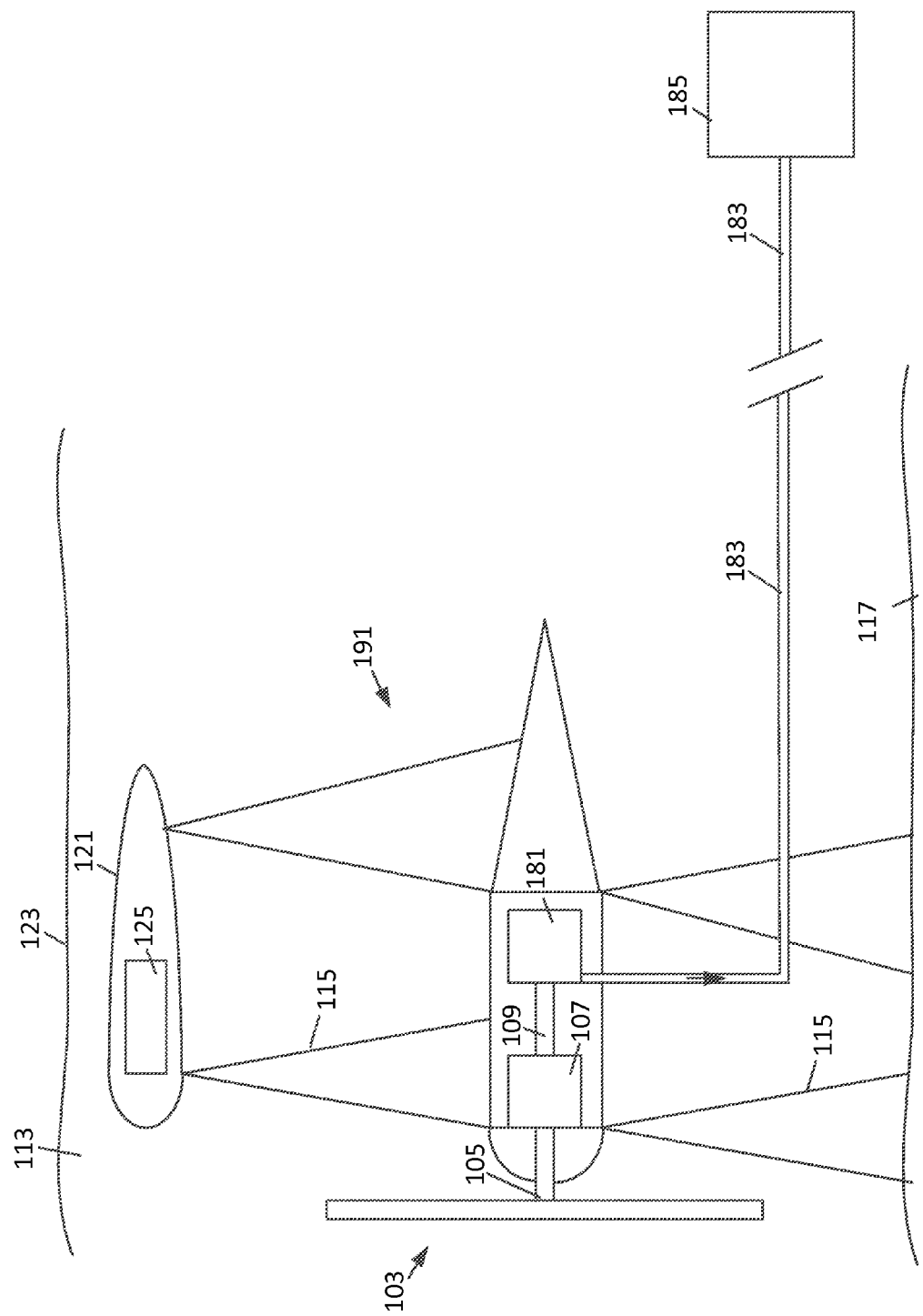
FIG. 5 illustrates an electrical generator system and on electrical energy generation system.
Figure 9:
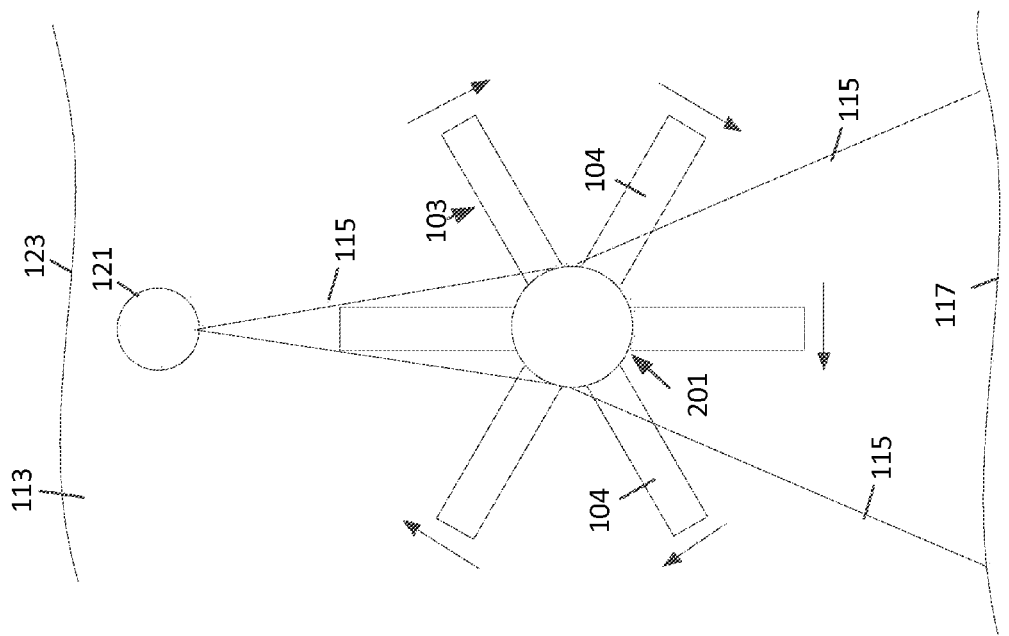
Figure 8:
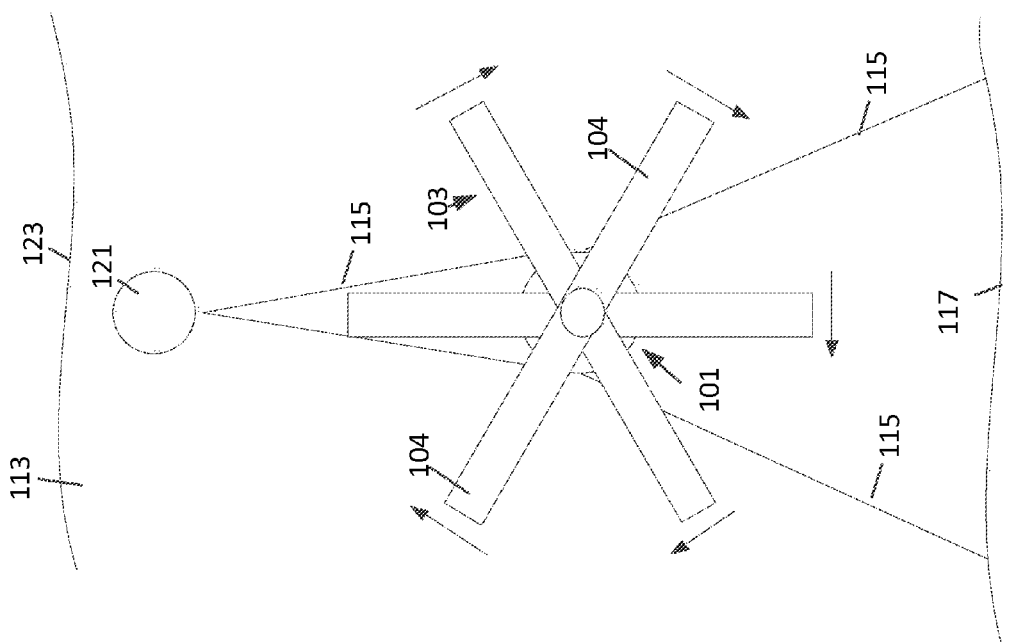

FIGS. 8 and 9 are front views of FIG. 1 and FIG. 5 respectively. The tethers 115 between the floor 117 and the pump assemblies 101, 201 can be angled outward and coupled to the outer sides of the pump assemblies 101, 201. This configuration can be necessary to counter act the torque forces applied to the pump assemblies 101, 201 by the turbines 103. For example, if the turbines 103 rotate clockwise facing the front of the system then the rotational force, which drives the gear system and pump, will create a clockwise torque on the pump assembly. By placing the tethers 115 as wide as possible on the pump assemblies 101, 201, the tethers 115 can better resist the torque forces from the turbine 103. The torque force can be represented by F×R which is the distance from the center shaft. Since the tethers 115 may only resist tension, the torque force may be mostly applied to the tethers 115 coupled to the left side of the pump assemblies 101, 201. The torque force may also be applied to the tethers 115 extending between the pump assemblies 101, 201 and the buoyancy structure 121. Again, since the tethers 115 may only function in tension, the tethers 115 on the right side of the pump assemblies 101, 201 may have added tension forces applied due to the torque of the turbine 103.

With reference to FIG. 10, another method for resisting the torque forces of the turbine 103 can be to attach extensions 161 to the sides of the pump assembly 201. In this illustration, the extensions extend beyond the outer diameter of the turbine 103 and provide a much longer arm length R to resist the turbine torque. Thus the force F, which is an additional tension force on the tethers 115, can be proportionally lower. In this example, the arm length R may be about 4+ times the width of the pump assembly 201. Extensions 161 can also be placed on the buoyancy device 121 and can provide additional torque resistance. This configuration can also keep the tethers 115 away from the turbine 103 in the event that the turbine 103 moves into close proximity of the tethers 115.

Figure 11:
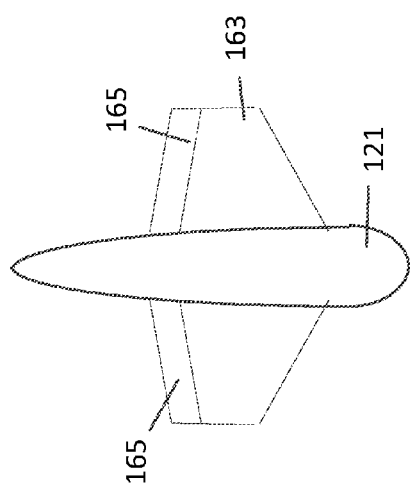
FIG. 11 illustrates a top view of an embodiment of the buoyancy structure with wings.
Figure 12:
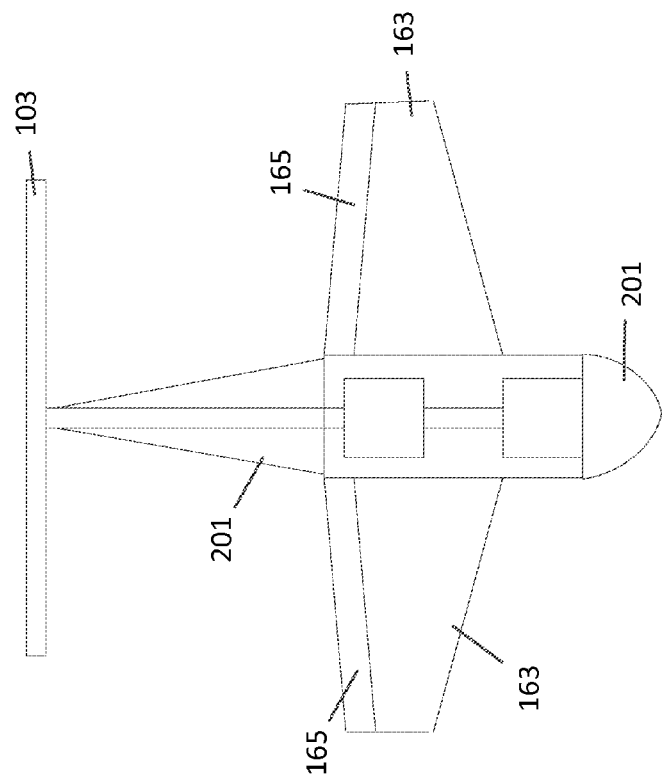
FIG. 12 illustrates a top view of an embodiment of the pump assembly with wings.

With reference to FIG. 11 a top view of an embodiment of a buoyancy structure 121 is illustrated and with reference to FIG. 12 a top view of an embodiment of a pump assembly 201 is illustrated. In these illustrated embodiments, the extensions can be wings 163 that have elevators 165 or can be positioned to resist the turbine torque. More specifically, as the liquid flows over the wings 163, the wings 163 can be configured to generate a rotational torque on the pump assembly 201 that resists the turbine 103 torque. For example, the left elevator 165 can be raised and the right elevator 165 can be lowered to produce a counter clockwise torque on the pump assembly 201. Since tether 115 tension forces can be transmitted from the buoyancy structure 121, these wings 163 can also be configured to transmit a counter clockwise torque.

In another embodiment, the wings 163 can provide lift that can supplement the upward buoyant forces of the buoyancy structure 121 and/or the pump assembly 201. The lift can be produced by the flow of liquid over the wings, which can have an upward pitch. The wing 163 lift can also be generated with the elevators 165, which can be raised to cause the wings to generate lift and the lift force can be used to put the tethers 115 in tension.

Figure 13:
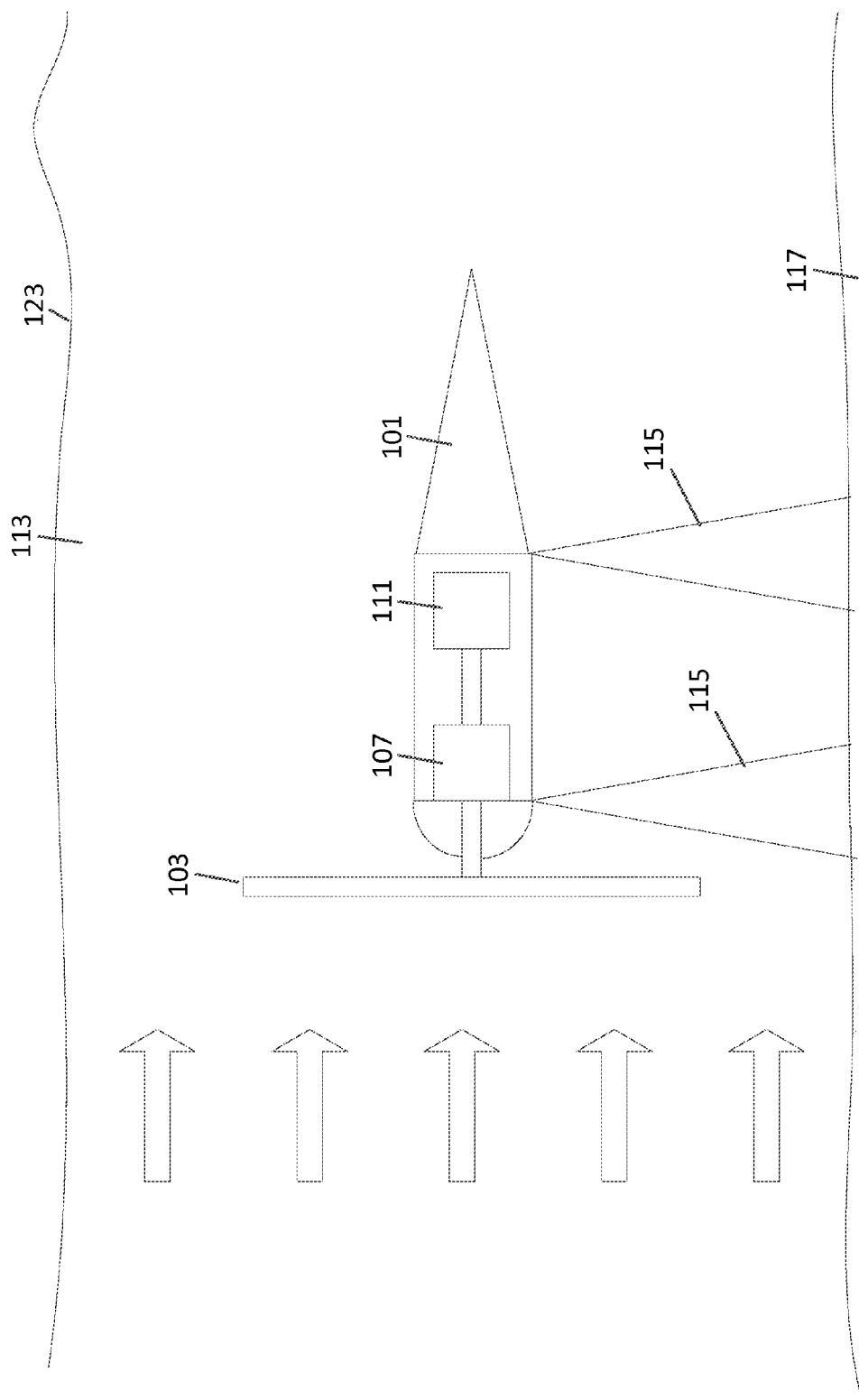
FIG. 13 illustrates an embodiment of the pump assembly having an integrated positive buoyancy system without the buoyancy structure.
Figure 14:
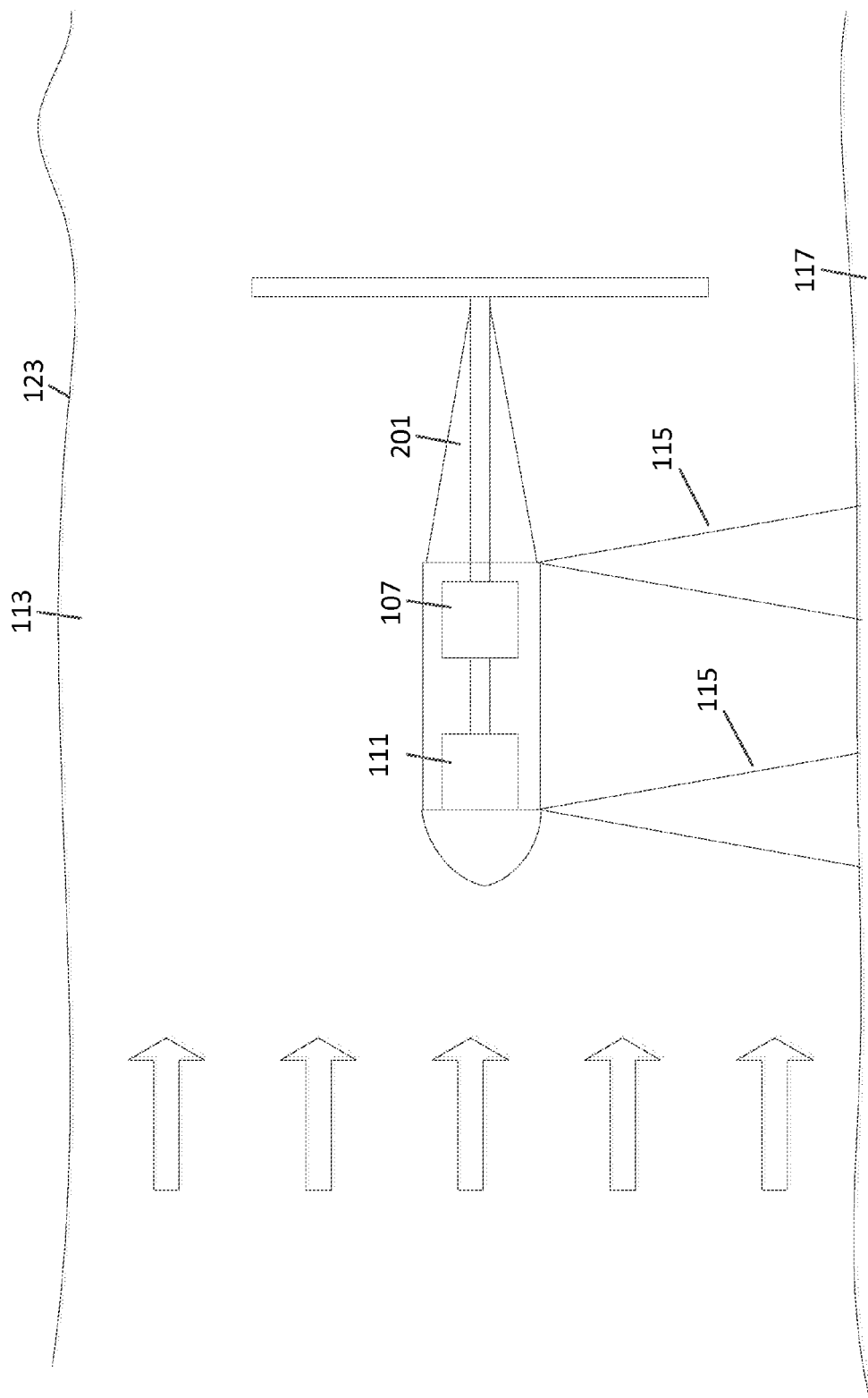
FIG. 14 illustrates an embodiment of the pump assembly having an integrated positive buoyancy system without the buoyancy structure.

In another embodiment with reference to FIG. 13, the pump assembly 101 can include an integrated positive buoyancy system (as described above with reference to FIGS. 2 and 3). Thus, the system may include a turbine 103 coupled to the pump assembly 101 that is tethered with tethers 115 to a floor 117 at the bottom of the body of water 113. In this embodiment, the pump assembly 101 does not require the positive buoyancy structure. The inventive system can include a pump assembly 101 that is coupled to a turbine 103 that uses fluid movement to rotate the turbine 103 and power the pump 111 through a gear system 107. The pump assembly 201 can have positive buoyancy that causes the pump assembly 101 to float above the floor 117 at the bottom of the body of water 113. The tethers 115 can prevent the pump assembly 101 and turbine 103 from floating to the surface 123 of the water 113. FIG. 14 illustrates an embodiment of the inventive system with the turbine 103 mounted at the rear end of the pump assembly 201.

Figure 16:
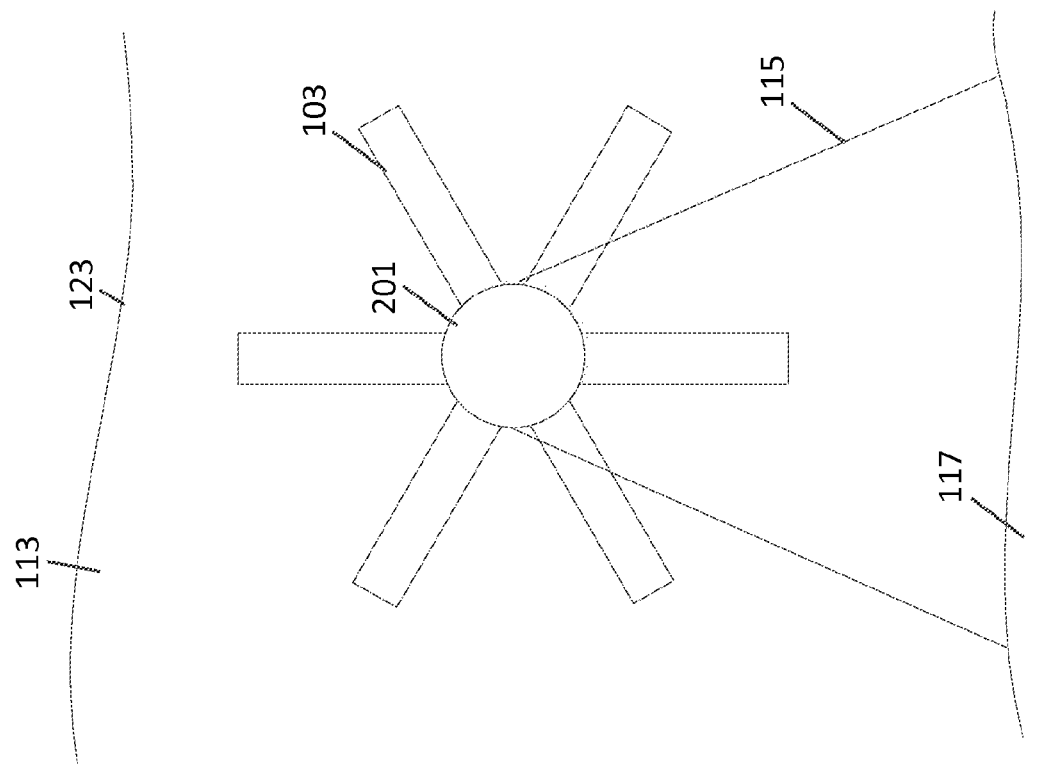
Figure 15:
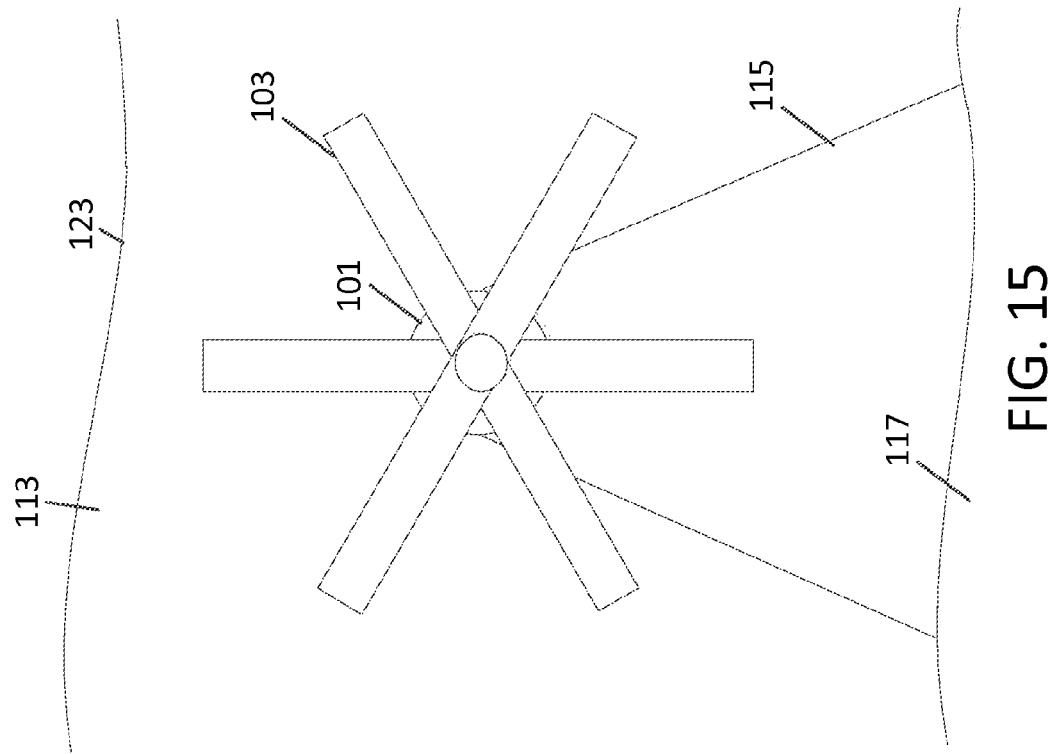

FIGS. 15 and 16 illustrate front views of FIGS. 13 and 14 respectively. Again, the tethers 115 can be mounted to the outer side of the pump assemblies 101, 201 to resist the torque applied to the pump assemblies 101, 201 from the turbines 103.

FIG. 17 illustrates a front view of an embodiment of the inventive system with extensions 161 coupled to tethers 115 coupled to the water floor 117. The extensions 161 can be wings 163 with elevators 165 (as shown in FIG. 11) that provide a hydrodynamic counter torque force that resists the turbine 103 torque applied to the pump assembly 201 as described above.

In an embodiment, force transducers 167 can be coupled to one more of the tethers 115 for monitoring the forces applied to the tethers 115. If excessive force is applied, a warning system can notify the system operators. The forces applied to the tethers 115 can include hydrodynamic drag in the horizontal direction. In an embodiment, the hydrodynamic drag can be reduced by lowering the angle of the turbine blades 104 which can result in lowing the horizontal forces on the tethers 115.

In an embodiment, the force transducers 167 can have positive buoyancy or alternatively, buoyancy devices 168 can be coupled to the force transducers 167. In either configuration, the force transducers 167 will not sink if the devices are accidentally dropped. This configuration can prevent the force transducers 167 from being accidentally lost. During the assembly process, the force transducers 167 can first be coupled to the tethers 115. If the force transducers 167 are dropped, the transducer 167 and the attached tether 115 can come to rest above the sea floor 117 so that it can be easily retrieved. In contrast, if the force transducer 167 has negative buoyancy or is not coupled to a buoyancy device 168, the force transducer 167 and any connected tether 115 will sink to the sea floor 117 when dropped. It can be difficult to see and retrieve these components if they are resting on the sea floor 117.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:
1. A power generator comprising:
 a pump assembly comprising a pump and a turbine coupled to a shaft that actuates the pump wherein a body of water flows round the pump assembly causing the turbine to rotate and producing a turbine torque on the pump assembly;
 wings that include elevators that extend horizontally outward from the pump assembly wherein the elevators provide a torsional force that counteracts the turbine torque;
 a first plurality of tethers that are coupled to the pump assembly and a fixed point in the body of water wherein the first plurality of tethers are coupled to the wings;
 a variable buoyancy mechanism that provides a variable positive buoyancy force within the body of water; and
 a second plurality of tethers that are coupled to the pump assembly and the variable buoyancy mechanism wherein tension in the second plurality of tethers supports the pump assembly.
2. The power generator of claim 1 further comprising:
 an inlet that provides water to the pump; and an outlet pipe that contains pressurized water from the pump.

3. The power generator of claim 2 wherein the inlet and the output pipe are coupled to a power station and are part of a closed loop system.

4. The power generator of claim 2 wherein the output pipe is coupled to a power station and is part of an open loop system.

5. A power generator comprising:
- a pump assembly comprising a pump and a turbine coupled to a shaft that actuates the pump wherein a body of water flows round the pump assembly causing the turbine to rotate and producing a turbine torque on the pump assembly; and
- wings that include elevators that extend horizontally outward from the pump assembly wherein the wings provide a torsional force that counteracts the turbine torque; and
- a first plurality of tethers that are coupled to the pump assembly;
- a variable buoyancy mechanism that provides a variable positive buoyancy force within the body of water; and
- a second plurality of tethers that are coupled to the pump assembly and the variable buoyancy mechanism wherein tension in the second plurality of tethers supports the pump assembly.

6. The power generator of claim 5 wherein the pump is electrically coupled to a power station.

7. The power generator of claim 5 further comprising:

an inlet that provides water to the pump; and an outlet pipe that contains pressurized water from the pump wherein the output pipe is coupled to a power station.

* * * * *